United States Patent [19]

Keenan

[11] 3,886,211
[45] May 27, 1975

[54] CARBOXYLIC ACID HYDRAZIDE DERIVATIVES

[75] Inventor: John Francis Edmund Keenan, Cheadle Hulme, England

[73] Assignee: Ciba-Geigy Corporation, Ardsley, N.Y.

[22] Filed: Mar. 5, 1970

[21] Appl. No.: 16,971

Related U.S. Application Data

[63] Continuation-in-part of Ser. No. 881,282, Dec. 1, 1969, abandoned.

[30] Foreign Application Priority Data

Dec. 10, 1968 United Kingdom............... 58503/68

[52] U.S. Cl. .... 260/561 H; 252/51.5 A; 260/347.3; 260/404.5; 260/482 R; 260/500.5; 260/554; 260/558 H
[51] Int. Cl. ......................................... C07c 103/30
[58] Field of Search..................... 260/404.5, 561 H

[56] References Cited
UNITED STATES PATENTS

| | | | |
|---|---|---|---|
| 2,355,911 | 8/1944 | Graenacher | 260/404.5 X |
| 3,182,039 | 5/1965 | Remy | 260/561 H X |
| 3,441,606 | 4/1969 | Moore et al. | 260/561 |
| 3,547,646 | 12/1970 | Hori et al. | 260/561 H |
| 3,564,048 | 2/1971 | Fletcher et al. | 260/514 |

FOREIGN PATENTS OR APPLICATIONS

| | | | |
|---|---|---|---|
| 1,247,320 | 7/1957 | France | 260/404.5 |
| 1,085,028 | 6/1954 | France | 260/561 H |

OTHER PUBLICATIONS

Hiroshi, Chem. Abstracts, 72:42641b.
Bellasio, Chem. Abstracts, 69:10392t.
CA: 71:60967u.
CA: 70:114916.

*Primary Examiner*—Lewis Gotts
*Assistant Examiner*—Ethel G. Love
*Attorney, Agent, or Firm*—Wenderoth, Lind & Ponack

[57] ABSTRACT

Hydrazides containing, as a characterising feature, the grouping having the formula:

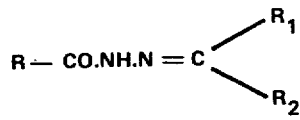

wherein R is alkyl, aryl or the group

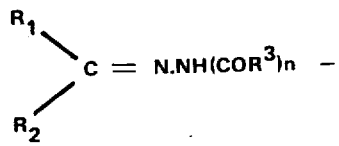

wherein $R_1$ is hydrogen or alkyl, $R_2$ is alkyl or the group —CH=N.NHCOR or $R_1$ and $R_2$ together are cycloalkyl or 5-nitrofuryl, $R^3$ is alkylene, or a vinylene or phenylene residue and $n$ is 0 or 1; and synthetic lubricant compositions comprising hydrazides having the formula:

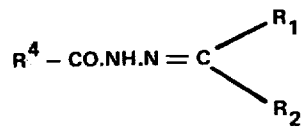

wherein $R^4$ is amino, alkyl, aryl or one of the groupings

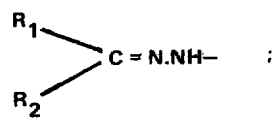 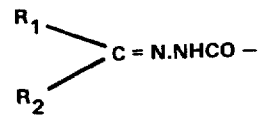

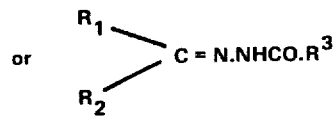

wherein $R_1$, $R_2$, $R_3$ and $n$ are as defined above.

5 Claims, No Drawings

CARBOXYLIC ACID HYDRAZIDE DERIVATIVES

This application is a continuation-in-part of application Ser. No. 881,282, filed Dec. 1, 1969, now abandoned.

The present invention relates to new chemical compounds and in particular to new hydrazides and to compositions comprising said hydrazides.

According to the present invention, there is provided a carboxylic acid

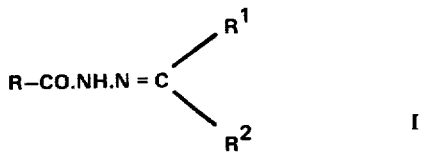

wherein R is an alkyl group having from 1 to 12 carbon atoms or an aryl group which is either unsubstituted or hydroxysubstituted; or R represents a group having the formula:-

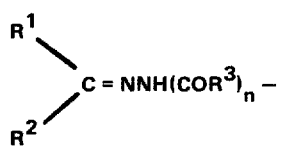

wherein $R^1$ is hydrogen or an alkyl group having from 1 to 12 carbon atoms which may be substituted by a carboxylic acid ester group, $R^2$ is an alkyl group having from 1 to 12 carbon atoms which may be substituted with a carboxylic acid ester group or represents the group —CH = N.NH COR wherein R has its previous significance, or $R^1$ and $R^2$ are linked to form a cycloalkyl residue having 5 or 6 carbon atoms which is unsubstituted or substituted with an alkyl group having from 1 to 6 carbon atoms, or to form a 5-nitrofuryl group, $R^3$ is an alkylene residue having from 1 to 12 carbon atoms, a vinylene residue, or a phenylene residue, and $n$ is 0 or 1.

If R is an alkyl group having from 1 to 12 carbon atoms, the group may be of straight- or branched-chain, for instance a methyl, ethyl, n-propyl, n-butyl, iso-butyl, tertiary-butyl, n-amyl, iso-amyl, n-heptyl, n-octyl, iso-octyl, n-nonyl, n-decyl, n-undecyl or n-dodecyl group, but is preferably of from 1 to 6 carbon atoms and is more preferably methyl or n-hexyl.

As an alternative, R may be an aryl group optionally hydroxy-substituted, a preferred example of such a group being an unsubstituted phenyl group.

If $R^1$ is hydrogen, $R^2$ is advantageously an alkyl group having from 1 to 6 carbon atoms especially a methyl or n-hexyl group.

If $R^1$ and $R^2$ are each alkyl radicals having from 1 to 12 carbon atoms, they may be, for example, a methyl, ethyl, n-propyl, n-butyl, iso-butyl, tertiaryr-butyl, n-amyl, iso-amyl, n-hexyl, n-heptyl, n-octyl, iso-octyl, n-nonyl, n-decyl, n-undecyl or n-dodecyl group, but are preferably of from 1 to 6 carbon atoms and most preferably are each a methyl group.

The groups $R^1$ and $R^2$ may also be joined together to form a cyclopentyl or cyclohexyl residue, each preferably unsubstituted but optionally substituted with one or more alkyl groups having from 1 to 6 carbon atoms, especially an n-butyl group. Alternatively, $R^1$ and $R^2$ may be linked to form a 5-nitrofuryl residue.

If $R^3$ is an alkylene residue having from 1 to 12 carbon atoms, it is advantageously of straight-chain and may be, for instance, methylene, ethylene, n-propylene, n-butylene, n-amylene, n-hexylene, n-heptylene, n-octylene, n-decylene or n-dodecylene.

Examples of preferred compounds of formula I include, therefore, acetic acid cyclohexylidene hydrazide, n-heptanoic acid cyclohexylidenehydrazide, fumaric acid di-(cyclohexylidene hydrazide), fumaric acid di-(2-n-butylcyclohexylidene hydrazide), glyoxal di-(heptanoic hydrazide), malonic acid di-(cyclohexylidene hydrazide), succinic acid di-(cyclohexylidene hydrazide), adipic acid di-(cyclopentylidene hydrazide), adipic acid di-(cyclohexylidene hydrazide), sebacic acid di-(cyclohexylidene hydrazide), sebacic acid di-(isopropylidene hydrazide), sebacic acid di-(heptylidene hydrazide) dodecane-1, 12-dioic acid di-(cyclohexylidene hydrazide), terephthalic acid di-(cyclohexylidene hydrazide), N:N' di-(cyclohexylidene carbohydrazide), oxalic acid di-(4-n-carbobutoxybut-2-ylidene hydrazide), and adipic acid di-(4-n-carbobutoxybut-2-ylidene hydrazide), and adipic acid di-(2-octylidene hydrazide).

The present invention also provides a process in which a hydrazide of formula I is produced, which comprises contacting a hydrazide having the formula:

wherein $R$ is as hereinbefore defined, with a compound having the formula:

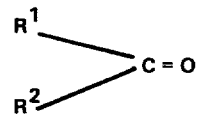

wherein $R^1$ and $R^2$ are as defined under formula I.

The process of the present invention may be conveniently effected by contacting the carbonyl compound of formula IV, which is normally a liquid, with a stirred suspension or solution of the hydrazide compound of formula III, in a solvent inert under the reaction conditions. If a homogenous reaction mixture is obtained in the cold, no heating is usually necessary to effect reaction. However, if a homogeneous reation mixture is not obtained in the cold, it is normally desirable to heat the mixture until all, or substantially all of the undissolved material has gone into solution.

The use of a reaction solvent is not essential however and, if desired, the reaction may be performed in the absence of an extraneous solvent, in which case it is normally advantageous to employ an amount of the liquid compound of formula IV in excess of the stoichiometric proportion required in the reaction. In the preferred instance in which a reaction solvent is used, the respective proportions of the compounds of formula III and IV employed in the reaction are desirably substantially the stoichiometric proportions required to produce the compound of formula I.

The reaction is normally advantageously continued until the reaction mixture becomes homogeneous or substantially homogeneous. In most instances, a reaction period of from 10 minutes to 5 hours is sufficient to ensure the completion of the reaction.

When the reaction period is over, the desired product of formula I is normally precipitated from solution and may consequently be isolated by filtration. If desired, the product of formula I may be purified, for example, by recrystallisation from a suitable solvent.

The process of the present invention may be effected using the hydrazide of formula III prepared previously or prepared in situ. The hydrazide of formula III for use in the process of the present invention may be conveniently obtained by reacting an alkyl ester of the carboxylic acid having the formula:-

V wherein R has its previous significance, with hydrozine hydrate.

There is also provided, according to the present invention, a composition comprising a synthetic carboxylic ester lubricant and, as a metal corrosion inhibitor, a compound having the formula:

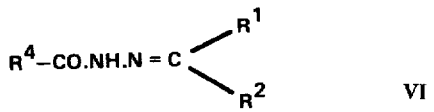

VI wherein $R^4$ is an amino group, an alkyl group having from 1 to 12 carbon atoms or an aryl group either unsubstituted or hydroxy-substituted, or represents one of the groups having the formulae:

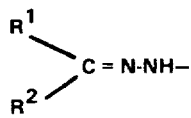

VII or

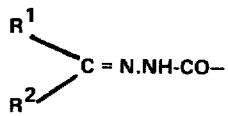

VIII or

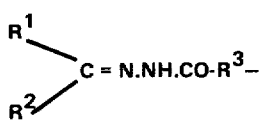

IX in which $R^1$ is hydrogen, or an alkyl group having from 1 to 12 carbon atoms, which may be substituted with a carboxylic acid ether group, $R^2$ is an alkyl group having from 1 to 12 carbon atoms, which may be substituted with a carboxylic acid ester group, or represents the group $-CH=N.NHCOR^4$ wherein $R^4$ has its previous significance, or $R^1$ and $R^2$ are linked to form a cycloalkyl residue having 5 to 6 carbon atoms unsubstituted or substituted with an alkyl group having from 1 to 6 carbon atoms, or are linked to form a 5-nitrofurfuryl group, and $R^3$ is an alkylene residue having from 1 to 12 carbon atoms, a vinylene residue, or a phenylene residue.

Synthetic carboxylic acid esters which are suitable as components of the compositions of the present invention include, di-esters of a dibasic acid and a monohydric alcohol, for example, dioctyl sebacate or dinonyl adipate, tri-esters of trimethylol propane and monobasic acids or mixtures of such acids, for instance, trimethylol propane tripelargonate, trimethylol propane tricaprylate or mixtures thereof, tetraesters of pentaerythritol and monobasic acids or mixtures thereof, for example, pentaerythritol tetracaprylate, pentaerythritol tetraheptanoate or mixtures thereof, acid end-stopped complex esters derived from monobasic acids, dibasic acids and polyhydric alcohols, for instance, a complex ester derived from trimethylol propane, caprylic acid and sebacic acid, alcohol end-stopped complex esters derived from monohydric alcohols, dibasic acids and polyhydric alcohols, for instance, a complex ester derived from iso-octanol, sebacic acid and an alkylene glycol such as ethylene glycol, or mixtures of such esters.

If $R^4$ is an alkyl group having from 1 to 12 carbon atoms the group may be of straight- or branched-chain, for instance a methyl, ethyl, n-propyl, n-butyl, iso-butyl, tertiary-butyl, n-amyl, iso-amyl, n-heptyl, n-octyl, iso-octyl, n-nonyl, n-decyl, n-undecyl or n-dodecyl group, but is preferably of from 1 to 6 carbon atoms and is more preferably methyl or n-hexyl.

As an alternative, $R^4$ may be an aryl group optionally hydroxy-substituted, a preferred example of such a group being an unsubstituted phenyl group.

The preferred ranges for the substituents $R^1$, $R^2$ and $R^3$ stated previously for the compounds of formulae I and II apply equally for the compounds of formulae VI, VII, VIII and IX.

Examples of preferred compounds of formula VI useful in the compositions of the present invention include acetic acid cyclohexylidene hydrazide, n-heptanoic acid cyclohexylidene hydrazide, fumaric acid di-(cyclohexylidene hydrazide), furmaric acid di-(2-n-butylcyclohexylidene hydrazide), glyoxal di-(heptanoic hydrazide), succinic acid di-(cyclohexylidene hydrazide), adipic acid di-(cyclopentylidene hydrazide), adipic acid di-(cyclohexylidene hydrazide), sebacic acid di-(cyclohexylidene hydrazide), sebacic acid di-(heptylidene hydrazide), dodecane-1,12-dioic acid di-(cyclohexylidene hydrazide), terephthalic acid di-(cyclohexylidene hydrazide), N:N'-di-(cyclohexylidene carbohydrazide), methyl hexyl ketone semi-carbaxone, cyclohexanone semicarbazone, acetophenone semicarbazone, adipic acid di (5-nitrofurfurylidene hydrazide), oxalic acid di (4-n-carbobutoxybut-2-ylidene hydrazide) and adipic acid di(4-n-carbobutoxybut-2-ylidene hydrazide), and adipic acid di-(2-octylidene hydrazide).

The proportion of the compound of formula VI which is present in the lubricant compositions may be, for example, within the range of from 0.01 to 5 percent by weight, more preferably within the range of from 0.05 to 2 percent by weight based on the total weight of the composition.

In addition to the two essential components, the lubricant composition of the present invention preferably also comprises an antioxidant effective against the oxidative deterioration of the lubricant when in use at elevated temperatures. Examples of suitable antioxidants include those based on diarylamine, phenothiazine or iminodibenzyl structures and the mono-alkylated derivatives of these sytems. A particularly preferred class of antioxidants are the mono-tertiaryalkyl derivatives of diarylamines described and claimed in British Pat. No. 1,046,353.

Other additives which may be present in the composition of the present invention if desired, include, for instance, pour-point depressants, viscosity-index improvers and load-carrying additives. If present, each of these additives is advantageously employed in a proportion within the range of from 0.01 to 5 percent weight based on the total weight of the composition.

The new hydrazides of the present invention are excellent metal corrosion inhibitors, especially for copper, in synthetic ester lubricants. In addition, certain of the hydrazides exhibit antioxidant activity especially in synthetic ester lubricants. The compositions of the present invention therefore find application as synthetic lubricants for service at elevated temperatures.

The following Examples further illustrate the present invention. Parts by weight shown therein bear the same relation to parts by volume as do kilograms to litres.

EXAMPLE 1

14.4 parts by weight of dimethyl fumarate were mixed with 250 parts by volume of water and the solution was cooled to 0°C. 10.1 parts by weight of hydrazine hydrate were added to the cooled solution over a period of 30 minutes, and the solution was then stirred at 0°C for 3 hours. 60 parts by volume of 50 percent weight/volume hydrochloric acid were added over 30 minutes while the solution was stirred continuously, then, when all the solid had dissolved, 19.6 parts by weight of cyclohexanone were added over 10 minutes after which time the solution became yellow. On standing, 19.0 parts by weight of a white solid precipitated from the solution and were filtered off, washed with cold water and dried. On recrystallisation from methanol, fumaric acid di(cyclohexylidene hydrazide) was obtained having melting point in the range 246° to 248°C and the following elemental analysis by weight:

|  | Found | Calculated (for $C_{16}H_{24}N_4O_2$) |
|---|---|---|
| carbon | 63.22% | 63.13% |
| hydrogen | 8.12% | 7.95% |
| nitrogen | 18.56% | 18.41% |

EXAMPLE 2

A suspension of 9.1 parts by weight of fumaric acid dihydrazide in 250 parts by volume of methanol was stirred at 25°C. and 13.0 parts by weight of cyclohexanone were added thereto. The reaction mixture was heated under reflux conditions for 10 minutes and then cooled to 25°C. whereupon a white solid separated from the solution. The solid was separated by filtration, washed and dried to give 11.5 parts by weight of fumaric acid di(cyclohexylidene hydrazide) which was purified by recrystallisation in the manner described in Example 1.

EXAMPLE 3

A suspension of 4.5 parts by weight of fumaric acid dihydrazide in 150 parts by volume of methanol was treated with 7.0 parts by weight of 2-n-butylcyclohexanone at 25°C. while the mixture was stirred continuously. The reaction mixture was heated under reflux conditions for 2 hours after which time the mixture became homogenous. A portion of the reaction solvent was removed by distillation and the residual solution cooled to 25°C.

In this way, 6.5 parts by weight of fumaric acid di-(2-n-butylcyclohexylidene hydrazide) were obtained having melting point 204° to 205°C. and the following elemental analysis by weight:

|  | Found | Calculated (for $C_{24}H_{40}N_4O_2$) |
|---|---|---|
| carbon | 69.03% | 69.19% |
| hydrogen | 9.66% | 9.68% |
| nitrogen | 13.16% | 13.45% |

EXAMPLE 4

A suspension of 9.0 parts of carbohydrazide in 100 parts by volume of methanol was treated with 19.63 parts of cyclohexanone and the mixture heated under reflux conditions for 30 minutes.

On cooling to 25°C the solid product which separated was filtered off, washed and dried.

In this way, 20.6 parts of N:N'-di(cyclohexylidene carbohydrazide) were obtained having melting-point after recrystallisation from ethyl acetate of 168°C. and the following elemental analysis by weight:

|  | Found | Calculated (for $C_{13}H_{22}N_4O$) |
|---|---|---|
| carbon | 62.52% | 62.37% |
| hydrogen | 9.04% | 8.86% |
| nitrogen | 22.52% | 22.38% |

EXAMPLE 5

5.7 parts of acetyl hydrazine were dissolved in 50 parts by volume of methanol and this solution was added to a solution of 8.7 parts of cyclohexanone in 50 parts by volume of methanol and the resulting mixture was shaken and then left to stand at 25°C. for 1 hour. The solvent was removed by distillation to give 13.1 parts of solid residue.

The residue after recrystallisation from diisopropyl ether gave 7 parts of acetic acid cyclohexylidene hydrazide having melting-point of 124° to 125°C. and the following elemental analysis by weight.

|  | Found | Calculated (for $C_8H_{14}N_2O$) |
|---|---|---|
| carbon | 62.30% | 62.31% |
| hydrogen | 9.44% | 9.15% |
| nitrogen | 18.28% | 18.17% |

EXAMPLE 6

A suspension of 13.2 parts of malonic acid dihydrazide in 150 parts by volume of methanol was treated with 19.0 parts of cyclohexanone and the mixture heated under reflux conditions for 30 minutes after which time the mixture was homogeneous. The solvent was removed by distillation to give 31.7 parts of a syrupy residue.

Recrystallisation of the residue from n-propanol gave malonic acid di-(cyclohexylidene hydrazide) having melting-point of 184° to 186°C. and the following elemental analysis by weight:

|          | Found   | Calculated (for $C_{13}H_{24}N_4O_2$) |
|----------|---------|-----------|
| CARBON   | 61.44%  | 61.62%    |
| hydrogen | 8.51%   | 8.27%     |
| nitrogen | 19.04%  | 19.16%    |

EXAMPLE 7

A suspension of 10 parts of succinic acid dihydrazide in 150 parts by volume of ethanol was treated with 10 parts of cyclohexanone and the mixture heated under reflux conditions for 30 minutes.

The homogeneous solution so obtained was cooled to 25°C. and the solid which precipitated was filtered off, washed and dried.

In this way, 13.4 parts of succinic acid di (cyclohexylidene hydrazide) having melting-point, after recrystallisation from ethanol, of 175° to 177°C and the following elemental analysis:

|          | Found   | Calculated (for $C_{16}H_{26}N_4O_2$) |
|----------|---------|-----------|
| carbon   | 62.57%  | 62.72%    |
| hydrogen | 8.61%   | 8.55%     |
| nitrogen | 18.21%  | 18.28%    |

EXAMPLE 8

A suspension of 8.7 parts of adipic acid dihydrazide in 150 parts by volume of methanol was treated with 8.4 parts of cyclopentanone and the mixture heated under reflux conditions for 2 hours. On cooling to 25°C, a solid was formed which was filtered off, washed and dried.

In this way, 10.1 parts of adipic acid di (cyclopentylidene hydrazide) were obtained which, after recrystallisation from methanol had melting-point 196° to 198°C and the following elemental analysis. by weight:

|          | Found   | Calculated (for $C_{16}H_{26}N_4O_2$) |
|----------|---------|-----------|
| carbon   | 62.38%  | 62.72%    |
| hydrogen | 8.53%   | 8.55%     |
| nitrogen | 18.04%  | 18.28%    |

EXAMPLE 9

5.0 parts of heptanoic hydrazide were warmed with excess cyclohexanone. The major proportion of the excess cyclohexanone was removed by distillation after which a solid crystallised from the mother liquor and this solid was separated off, washed and dried.

In this way, 5.9 parts of heptanoic acid cyclohexylidene hydrazide which, after recrystallisation from diisopropyl ether, had melting-point of 84° to 85°C and the following elemental analysis by weight:

|          | Found   | Calculated (for $C_{13}H_{24}N_2O$) |
|----------|---------|-----------|
| carbon   | 69.74%  | 69.60%    |
| hydrogen | 10.79%  | 10.78%    |
| nitrogen | 12.57%  | 12.49%    |

EXAMPLE 10

A suspensionn of 5.0 parts of sebacic acid dihydrazide in 150 parts by volume of ethanol was heated to reflux and 6.0 parts of cyclohexanone were added to the refluxing solution, the mixture immediately becoming homogeneous. The solution was heated under reflux conditions for a further 30 minutes, the solvent removed to leave 9.0 parts of a solid residue.

In this way, sebacic acid di (cyclohexylidene hydrazide) was produced which, after recrystallisation from toluene, had melting point of 142° to 143.5°C and the following elemental analysis by weight:

|          | Found   | Calculated (for $C_{22}H_{38}N_4O_2$) |
|----------|---------|-----------|
| carbon   | 67.64%  | 67.66%    |
| hydrogen | 9.89%   | 9.81%     |
| nitrogen | 13.98%  | 14.34%    |

EXAMPLE 11

A suspension of 5.0 parts of sebacic acid dihydrazide in 150 parts by volume of ethanol was reacted with 10 parts by volume of acetone in the manner described in Example 10.

In this way, 7.5 parts of the acetone derivative of sebacic acid dihydrazide were produced which, after recrystallisation from dimethyl formamide, had melting-point of 113° to 115°C and the following elemental analysis by weight:

|          | Found   | Calculated (for $C_{16}H_{30}N_4O_2$) |
|----------|---------|-----------|
| carbon   | 61.75%  | 61.90%    |
| hydrogen | 9.74%   | 9.74%     |
| nitrogen | 17.76%  | 18.05%    |

EXAMPLE 12

5.0 parts of sebacic acid dihydrazide suspended in 150 parts by volume of ethanol were contacted with 10 parts of heptaldehyde and the mixture heated under reflux conditions for 60 minutes after which time the mixture was homogeneous. On cooling to 25°C., a solid was precipitated from the mixture.

In this way, 5.6 parts of sebacic acid di (heptylidene hydrazide) which, after recrystallisation from ethanol, had melting point of 167° to 168°C and the following elemental analysis by weight:

|          | Found   | Calculated (for $C_{24}H_{46}N_4O_2$) |
|----------|---------|-----------|
| carbon   | 68.59%  | 68.20%    |
| hydrogen | 10.88%  | 10.97%    |
| nitrogen | 13.26%  | 13.26%    |

EXAMPLE 13

12.9 parts of dodecane-1:12-dioic acid hydrazide suspended 250 parts by volume of methanol were reacted with 12.0 parts of cyclohexanone in the manner described in Example 12. The solvent was removed by distillation to give 21.6 parts of a solid residue.

In this way, dodecane-1:12-dioic acid di (cyclohexylidene hydrazide) which, after recrystallisation from toluene, had melting point of 136° to 137°C and the following elemental analysis by weight:

|          | Found   | Calculated (for $C_{24}H_{42}N_4O_2$) |
|----------|---------|-----------|
| carbon   | 68.93%  | 68.86%    |
| hydrogen | 9.81%   | 10.11%    |
| nitrogen | 13.10%  | 13.38%    |

EXAMPLE 14

A mixure of 9.7 parts of terephthalic acid dihydrazide, 11.0 parts of cyclohexanone and 200 parts by volume of methanol was heated under reflux conditions and a portion of the solvent was then removed by distillation. On cooling to 25°C, a solid was precipitated.

In this way, 3.4 parts of terephthalic acid di (cyclohexylidene hydrazide) was obtained and which, after recrystallisation from dimethyl formamide, had melting-point 297° to 298°C (decomposition) and the following elemental analysis by weight:

|  | Found | Calculated (for $C_{20}H_{26}N_4O_2$) |
|---|---|---|
| carbon | 67.70% | 67.77% |
| hydrogen | 7.41% | 7.39% |
| nitrogen | 15.88% | 15.81% |

EXAMPLE 15

7.0 parts of heptanoic acid hydrazide were dissolved in 150 parts by volume of methanol and 2.0 parts of glyoxal were added to this solution. The suspension so formed was heated under reflux conditions for 30 minutes, cooled to 25°C and the solid precipitate which formed was filtered off, washed and dried.

In this way, 5.5 parts of glyoxal di (heptanoic hydrazide) were obtained and which, after recrystallisation from dimethyl formamide, had melting-point 278° to 279°C and the following elemental analysis by weight:

|  | Found | Calculated (for $C_{16}H_{30}N_4O_2$) |
|---|---|---|
| carbon | 62.13% | 61.90% |
| hydrogen | 9.77% | 9.74% |
| nitrogen | 17.76% | 18.05% |

EXAMPLE 16

A suspension of 80 parts of adipic acid dihydrazide in 500 parts by volume of ethanol was refluxed and treated with 90 parts of cyclohexanone. The solution became clear and refluxing was continued for 1 hour. After cooling, the white solid that had precipitated was filtered off giving 144 parts of adipic acid di(cyclohexylidene hydrazide) having a melting point of 196° to 199°C. This solid was recrystallised from ethanol giving a melting point of 197° to 199°C. and the following elemental analysis by weight.

|  | Found | Calculated (for $C_{18}H_{30}N_4O_2$) |
|---|---|---|
| carbon | 64.64% | 64.64% |
| hydrogen | 9.10% | 9.04% |
| nitrogen | 16.88% | 16.75% |

EXAMPLE 17

A mixture of adipic acid dihydrazide (17.4 parts) and a solution (65 parts) of 52 percent methyl hexyl ketone in octan-2-ol was stirred and heated to 110°C. for 30 minutes. On cooling with stirring, solid began to separate at 50°C. On standing at room temperature a solid cake was formed which was crystallized from ethyl acetate giving crude adipic acid di(2-octylidene hydrazide).

Recrystallisation from ethyl acetate gave a pure product with a melting point of 112°C to 114°C, and the following elemental analysis by weight:

|  | Found | Calculated(for $C_{22}H_{42}N_4O_2$) |
|---|---|---|
| carbon | 67.09% | 66.96% |
| hydrogen | 10.96% | 10.73% |
| nitrogen | 14.00% | 14.20% |

EXAMPLES 18 TO 35, 35A, B AND C

Synthetic ester-based lubricant compositions were prepared into which were incorporated 3.0 percent by weight of N-p-tertiaryoctyl-phenyl-β-naphthylamine as antioxidant, and each of the compositions was subjected to the Pratt and Whitney Type II oxidation-corrosion test. The base fluid in each of the tests was trimethylolpropane tripelargonate and each test was carried out for 48 hours at 425°F. with dry air at the rate of 5 litres per hour and in the presence of specimens of magnesium alloy, aluminium alloy, copper, silver and steel.

To each lubricant sample there was also added a compound having the formula VIII in the proportion indicated in the following Table.

The results of the tests are summarized in the Table wherein comparative data is included for lubricant compositions employing benzotriazole as the metal deactivator rather than a compound of formula VIII. In the Table, sludge is expressed in milligrams, and the weight change of the specimens as milligrams per square centimetre.

The following results clearly demonstrate the excellent viscosity/temperature properties, acidity stability, sludge formation properties and the very low level of metal corrosion of the synthetic carboxylic ester lubricant compositions of the present invention, especially when compared with similar compositions containing either no metal corrosion inhibitor or the previously-known benzotriazole inhibitor.

Table 1

Pratt and Whitney Type II Oxidation-Corrosion Test - 48 hours at 425°F.

| Example | Test Substance | Concentration % | % Increase in Viscosity 100°F. | % Increase in Acid Value | Sludge (mg./100 ml.) | Metal Attack - wt. changes in mg/cm.$^2$ | | | | |
|---|---|---|---|---|---|---|---|---|---|---|
|  |  |  |  |  |  | Cu | Fe | Ag | Al | Mg |
| Comparative A | No additive | 0.2 | 24.9 | 3.2 | 14.4 | −1.67 | −0.01 | −0.04 | −0.03 | −0.11 |
|  |  |  | 26.3 | 2.7 | 9.2 | −1.77 | −0.01 | −0.04 | −0.04 | −0.07 |
| Comparative B | Benzotriazole | 0.2 | 22.9 | 2.8 | — | −0.09 | +0.01 | −0.04 | −0.04 | 0.01 |
|  |  |  | 23.2 | 2.6 | 30.1 | −0.15 | +0.01 | −0.04 | −0.04 | −0.02 |
| 18 | N:N'-di(cyclohexylidene carbohydrazide) | 0.2 | 14.4 | 1.4 | 2.9 | −0.12 | nil | −0.07 | −0.05 | −0.06 |
|  |  |  | 14.4 | 1.5 | 2.6 | −0.11 | −0.01 | −0.09 | −0.06 | −0.06 |
| 19 | oxalic acid di(cyclohexylidene hydrazide) | 0.1 | 24.0 | 4.3 | 10.6 | −0.14 | −0.02 | −0.11 | −0.03 | −0.06 |
|  |  |  | 23.3 | 4.1 | 11.5 | −0.14 | −0.04 | −0.10 | −0.06 | −0.08 |
| 20 | fumaric acid di(cyclohexylidene hydrazide) | 0.25 | 9.6 | 2.7 | 11.9 | −0.04 | +0.02 | +0.05 | +0.04 | +0.05 |
|  |  |  | 10.5 | 3.1 | 15.7 | −0.05 | +0.02 | +0.01 | +0.03 | −0.05 |
| 21 | fumaric acid di(2-n-butylcyclohexylidene hydrazide) | 0.2 | 20.5 | 2.4 | 2.5 | −0.22 | −0.05 | −0.04 | −0.07 | −0.05 |
|  |  |  | 23.2 | 2.5 | 3.0 | −0.23 | −0.04 | −0.06 | −0.05 | −0.06 |
| 22 | succinic acid di(cyclohexylidene hydrazide) | *0.2 | 19.5 | 2.0 | 0.9 | −0.14 | −0.14 | −0.01 | −0.01 | −0.01 |
|  |  |  | 18.7 | 2.1 | — | −0.15 | −0.04 | −0.01 | −0.01 | −0.01 |
| 23 | adipic acid di(cyclopentylidene hydrazide) | 0.2 | 16.4 | 1.9 | 2.2 | −0.09 | nil | −0.01 | +0.01 | −0.04 |
|  |  |  | 15.4 | 1.7 | 6.4 | −0.11 | +0.03 | −0.02 | nil | −0.02 |

Table 1 —Continued

Pratt and Whitney Type II Oxidation-Corrosion Test - 48 hours at 425°F.

| Example | Test Substance | Concentration % | % Increase in Viscosity 100°F. | % Increase in Acid Value | Sludge (mg./ 100 ml.) | Metal Attack - wt. changes in mg/cm.² | | | | |
|---|---|---|---|---|---|---|---|---|---|---|
| | | | | | | Cu | Fe | Ag | Al | Mg |
| 24 | sebacic acid di(cyclohexylidene hydrazide) | 0.2 | 19.3 | 2.7 | 28.7 | +0.15 | +0.09 | +0.14 | +0.20 | +0.15 |
| 25 | sebacic acid di(isopropylidenehydrazide) | 0.2 | 18.7 | 2.6 | 12.8 | −0.13 | +0.14 | +0.09 | +0.15 | +0.08 |
| | | | 19.5 | 2.2 | 7.3 | +0.18 | +0.14 | +0.11 | +0.09 | +0.01 |
| 26 | dodecane 1:12-dioic acid di(cyclohexylidene hydrazide) | 0.2 | 19.9 | 2.2 | 2.2 | −0.06 | −0.01 | +0.01 | +0.01 | +0.02 |
| | | | 19.4 | 2.3 | 6.8 | −0.04 | nil | +0.04 | −0.05 | +0.05 |
| 27 | terephthalic acid di(cyclohexylidene hydrazine) | *0.2 | 18.0 | 1.9 | 21.3 | −0.06 | nil | −0.01 | −0.01 | nil |
| | | | 16.6 | 2.5 | 18.9 | −0.04 | +0.02 | −0.01 | −0.12 | −0.02 |
| 28 | glyoxal di(heptanoic hydrazide) | *0.2 | Gel | 2.1 | 2.0 | −0.21 | −0.02 | −0.01 | −0.02 | −0.04 |
| | | | | 1.6 | 2.0 | −0.23 | +0.02 | nil | −0.01 | −0.13 |
| 29 | acetic acid cyclohexylidenehydrazide | 0.2 | 21.6 | 2.1 | 3.1 | −0.18 | −0.01 | +0.04 | nil | −0.01 |
| | | | 19.7 | 2.0 | 5.2 | −0.18 | −0.01 | nil | nil | −0.04 |
| 30 | benzoic acid cyclohexylidenehydrazide | 0.2 | 19.6 | 2.6 | 6.2 | −0.30 | −0.02 | −0.02 | −0.01 | −0.03 |
| | | | 21.1 | 2.7 | 1.9 | −0.42 | −0.01 | −0.01 | +0.01 | −0.04 |
| 31 | heptanoic acid cyclohexylidenehydrazide | 0.2 | 24.2 | 2.3 | 0.2 | −0.49 | nil | −0.01 | nil | +0.01 |
| 32 | cyclohexanone semicarbazone | 0.2 | 23.2 | 2.9 | 3.4 | −0.14 | −0.06 | −0.04 | −0.07 | −0.03 |
| | | | 22.2 | 2.4 | 4.9 | −0.13 | −0.02 | −0.06 | −0.07 | −0.03 |
| 33 | methyl hexyl ketone semicarbazone | 0.2 | 19.9 | 1.6 | 10.7 | −0.28 | nil | +0.01 | +0.01 | +0.01 |
| | | | 20.7 | 2.0 | 10.9 | −0.32 | nil | +0.01 | +0.02 | +0.05 |
| 34 | adipic acid (cyclohexylidene hydrazide) | 0.2 | 17.9 | 1.9 | 7.0 | −0.09 | +0.01 | −0.01 | nil | +0.01 |
| | | | 17.4 | 1.8 | 8.0 | −0.07 | +0.01 | nil | −0.01 | nil |
| 35 | adipic acid di(5-nitrofurfurylidene hydrazine) | 0.2 | 23.18 | 2.0 | 2.3 | −0.14 | −0.02 | nil | +0.01 | nil |
| | | | 23.91 | 2.5 | 0.7 | −0.16 | −0.01 | −0.01 | −0.01 | −0.01 |
| 35A | adipic acid di(2-octylidene hydrazine) | *0.2 | 24.29 | 2.7 | 1.3 | −0.29 | −0.01 | +0.01 | +0.01 | +0.02 |
| | | | 29.88 | 2.2 | 0.6 | −0.26 | nil | +0.01 | +0.02 | +0.03 |
| 35B | adipic acid di(4-n-carbobutoxy-but-2-ylidene hydrazide) | 0.2 | 29.50 | 2.3 | 3.5 | −0.03 | nil | nil | +0.01 | +0.02 |
| | | | 31.48 | 1.9 | 3.2 | −0.04 | +0.04 | +0.04 | +0.03 | +0.02 |
| 35C | oxalic acid di(4-n-carbobutoxy-but-2-ylidene hydrazide) | 0.2 | 28.55 | 3.2 | 0.2 | −0.04 | +0.02 | +0.02 | +0.03 | −0.01 |
| | | | 30.30 | 2.0 | 0.2 | −0.03 | +0.03 | −0.01 | +0.03 | nil |

*In these cases the additine was not completely soluble at this level.

EXAMPLE 36

A mixture of 17.7 parts by weight of oxalic acid dihydrazide and 51.8 parts by weight of n-butyl levulinate was stirred and heated to 140°C. and water formed in the reaction was removed by distillation. When all the water of reaction had been removed, heating of the reaction mixture was continued at 117°C. for 35 minutes. On cooling the reaction mixture, a solid separated and this was removed by filtration. Recrystallisation of this solid gave 33.7 parts by weight of oxalic acid di(4-n-carbobutoxybut-2-ylidene hydrozide) having melting-point 102° to 103°C. and the following elemental analysis by weight:

| | carbon | hydrogen | nitrogen |
|---|---|---|---|
| Calculated | 56.32% | 8.04% | 13.14% |
| Found | 56.62% | 8.15% | 13.44% |

EXAMPLE 37

A mixture of 34.8 parts by weight of adipic acid dihydrazide and 68.9 parts by weight of n-butyl levalinate was stirred and heated to 160°C. At this temperature a homogeneous melt was obtained and water of reaction was removed by distillation as it was formed. When all the water formed had been removed, heating was continued at 112°C. for 30 minutes. After cooling the reaction mixture, the solid material was removed by filtration, and then crystallised twice from a mixture of toluene and petroleum ether (boiling range 60° to 80°C). In this way adipic acid di(4-n-carbobutoxybut-2-ylidene hydrozide) having melting point 94° to 96°C. and the following elemental analysis by weight, was obtained:

| | carbon | hydrogen | nitrogen |
|---|---|---|---|
| Calculated | 59.73% | 8.77% | 11.61% |
| Found | 59.59% | 8.72% | 11.87% |

EXAMPLES 38 AND 39

3 percent by weight of N-p-tertiary octyl-phenyl-β-naphthylamine and 0.2 percent by weight of dodecane - 1:12-dioic acid di(cyclohexylidene hydroxide) were incorporated into a mixed pentacrythritol ester derived from 2-ethyl hexoic acid heptori acid and caprylic acid or a complex ester derived from trimethyld propane, sebacec acid and the compositions so formed were subjected to the Pratt and Whitney Type II oxidation-corrosion test. The tests were carried out for 48 hours at 425°F. with dry air at the rate of 5 litres per hour and in the presence of specimens of magnesium alloy, aluminium alloy, copper, silver and steel.

The results achieved which demonstrate the excellent properties of the lubricant compositions so produced are summarised in the following Table II:

TABLE II

| Example | Bare fluid | % increase in viscosity | Sludge (mg. (100 ml.) | Metal attack (Weight changes in (mg./cm²) | | | | |
|---|---|---|---|---|---|---|---|---|
| | | | | Cu | Fl | Ag | Al | Mg |
| 38 | mixed pentaerythritol ester | 15.9 | 3.1 | −0.03 | +0.01 | nil | nil | −0.01 |
| 39 | complex trimethylol propane ester | 13.6 | 4.0 | −0.6 | nil | +0.01 | nil | nil |

We claim:
1. A carboxylic acid hydrazide compound of the formula

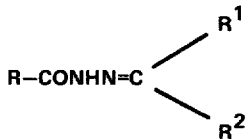

wherein R is an alkyl group having from 1 to 12 carbon atoms, R¹ is hydrogen or an alkyl group having from 1 to 12 carbon atoms, and R² represents the group —CH=NNHCOR, wherein R is as defined above.

2. A carboxylic acid hydrazide compound of the formula

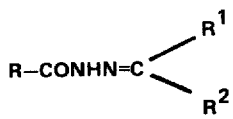    I wherein R represents a group of the formula

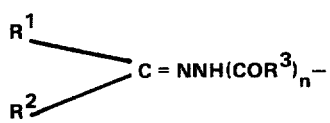    II in which R¹ is hydrogen or an alkyl group having from 1 to 12 carbon atoms, R² is an alkyl group having from 1 to 12 carbon atoms, R³ is an alkylene residue having from 1 to 12 carbon atoms or a vinylene residue, and $n$ is 1.

3. A carboxylic acid hydrazide compound of the formula

    I wherein R represents a group of the formula

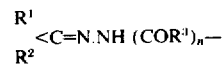    II in which formulae I and II R¹ is hydrogen or an alkyl group having from 1 to 12 carbon atoms, R² is an alkyl group having from 1 to 12 carbon atoms, or R¹ and R² are linked to form a cycloalkyl residue having 5 to 6 carbon atoms which is substituted by an alkyl group having from 1 to 6 carbon atoms, R³ is an alkylene residue having from 1 to 12 carbon atoms or a vinylidene residue and $n$ is 1.

4. Adipic acid di-(cyclopentylidene hydrazide).
5. Adipic acid di(2-octylidene hydrazide).

* * * * *